United States Patent Office 3,340,252
Patented Sept. 5, 1967

3,340,252
AMINO-ACYLAMINO-ACYLAMINO-
PENICILLANIC ACIDS
Harvey E. Alburn, West Chester, and Norman H. Grant, Wynnewood, Pa., assignors to American Home Products Corporation, New York, N.Y., a corporation of Delaware
No Drawing. Filed Apr. 7, 1964, Ser. No. 358,050
20 Claims. (Cl. 260—239.1)

This invention relates to new synthetic penicillins having potent activity against Gram-negative and Gram-positive microorganisms.

In our copending patent application Ser. No. 353,574, filed Mar. 20, 1964, now patent No. 3,268,513 and of which the present application is a continuation-in-part, there is disclosed a novel method for preparing amino-acylamino-acylamino penicillanic derivatives.

With the use of the method described in the said copending application, there has been discovered a series of new penicillanic acid derivatives having the formula:

$$X^1-CH-CO-NH-CH-CH\underset{O=C-N}{\overset{S}{\diagup}}\underset{H}{\overset{CH_3}{\diagup}}C-CH_3$$
$$\underset{Y}{\overset{NX^2}{|}} \qquad \qquad \underset{H}{\overset{|}{C}}-COOH$$

where:

$X^1$ is of the group consisting of hydrogen, alkyl, substituted alkyl, aralkyl, substituted aralkyl, aryl, substituted aryl, alkaryl, and substituted alkaryl;
$X^2$ is of the group consisting of hydrogen, alkyl, substituted alkyl, aryl, and substituted aryl; and
Y is of the group consisting of:

(1)
$$R^1-CH-CO-$$
$$\underset{R^2}{\overset{NH}{|}}$$

where:

$R^1$ is of the group consisting of hydrogen, alkyl, substituted alkyl, aryl, substituted aryl, alkaryl, and substituted alkaryl; and
$R^2$ is of the group consisting of alkyl and aryl;

(2)
$$(CH_2)_n\overset{|\phantom{xx}|}{\underset{|\phantom{xx}|}{C}}-CO-$$
$$\phantom{(CH_2)_n\;\;}\diagdown NH_2$$

where $n=2$ to 9;

(3)
$$R^3-\underset{R^4}{\overset{R^2\phantom{xx}R^1}{\diagup\phantom{xx}\diagdown}}-CO-$$
$$\phantom{xxxxxxx}HNR^5$$

where:

$R^1$, $R^2$, $R^3$, and $R^4$ are of the group consisting of hydrogen, alkyl, nitro, sulfo, amino, halo and hydroxy; $R^1$ and $R^2$, $R^2$ and $R^3$, and $R^3$ and $R^4$, when respectively joined, complete a ring of the group consisting of aryl and alicyclic; and
$R^5$ is of the group consisting of hydrogen and lower alkyl;

(4)
$$R^2-\underset{R^3}{\overset{R^1}{\diagup\diagdown}}-CH_2-CH-CO-$$
$$\phantom{xxxxxxxxx}\underset{H}{\overset{N}{|}}$$

where $R^1$, $R^2$, $R^3$ and $R^4$ are of the group consisting of hydrogen, alkyl, hydroxy, alkoxy, halo, amino and nitro;

(5)
$$R-S-(CH_2)_n-CH-CO-$$
$$\phantom{xxxxxxxxxx}\underset{NH_2}{|}$$

where:

$n=1$ to 5, and
R is of the group consisting of
   (a) hydrogen, alkyl, and
   (b) $A-CO-CH-(CH_2)_{n'}-S-$
   $\phantom{xxxxxxxx}\underset{NH_2}{|}$ in which case A is a second residue of the penicillanic acid derivative of Formula I above, and
$n'=1$ to 5;

(6)
$$(CH_2)_n\overset{|\phantom{xx}|}{\underset{|\phantom{xx}|}{HC}}-CO-$$
$$\phantom{(CH_2)_n\;\;}\diagdown NH$$

where:

R is of the group consisting of hydroxy and alkyl, and
$n=2$ to 7; and (7)
$$H_2N-CO-(CH_2)_n-CH-CO-$$
$$\phantom{xxxxxxxxxxxx}\underset{NH_2}{|}$$

where $n=1$ to 4;

Said compounds are useful for treatment of infectious diseases caused by Gram-positive and Gram-negative bacteria, upon either parenteral or oral administration. They also have use as nutritional supplements in animal feed.

The general process for preparing the aforesaid novel amino-acylamino-acylamino-penicillanic acids is described and claimed in said copending application and comprises generally the reaction of a 4-substituted-2,5-oxazolidine-dione (also known as an N-carboxy-amino acid anhydride) with a 6-(amino-acylamino)-penicillanic acid under controlled conditions. Methods for the preparation of the N-carboxy amino acid anhydride and 6-(amino-acylamino)-penicillanic acid reactants suitable for use in the process are also described in or referred to in said copending application.

In a preferred method for preparing the amino-acyl-amino-acylamino-penicillanic acids of the present invention, the 4-substituted-2,5-oxazolidinedione chosen is reacted with the selected 6-(α-amino-acylamino)-penicillanic acid in approximately equimolar quantities in a cold aqueous solution in a pH range from about 3.8 to about 7.4 and preferably in the range 4.7–7.0. The mixture is stirred for several hours at a temperature from just above the freezing point of the aqueous mixture to about 37° C., and preferably in the range 0–10° C. Although not essential, it may be preferred to include a buffer having an ionic strength of about 0.02, preferably about 0.3, to aid in keeping the reaction mixture within the required pH range. Suitable buffers for maintaining the desired pH may be any mixture of organic or inorganic water-soluble acids, bases, or salts such as sodium acetate-acetic acid, calcium acetate-acetic acid, pyridine-acetic acid, formic acid-ammonia, etc. Alternatively, the reaction mixture may be maintained within the requisite pH range by careful addition of a base such as NaOH or the like.

The following examples are illustrative of the invention, but are not to be considered necessarily limitative thereof.

*Example I.—6-[DL-2-(o-aminobenzamide)-N-methyl-2-phenylacetamido]penicillanic acid*

Mix 290 mg. (0.8 millimole) of 6-(DL-N-methyl-2-aminophenylacetamido)-pencillanic acid with 130 mg. (0.8 millimole) of isatoic anhydride in 200 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example II.—6-[DL-2-(2-amino-5-nitrobenzamido)-N-methyl-2-phenylacetamido]penicillanic acid*

Mix 290 mg. (0.8 millimole) of 6-(DL-N-methyl-2-aminophenylacetamido)penicillanic acid with 165 mg. (0.8 millimole) of 6-nitroisatoic anhydride in 20 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example III.—6-[DL-2-(2-amino-5-methyl-N-methylbenzamido)-2-phenylacetamido]penicillanic acid*

Mix 363 mg. (1 millimole) of 6-(DL-N-methyl-2-aminophenylacetamido)penicillanic acid with 151 (1 millimole) of 6-methylisatoic anhydride in 25 ml. of ice-cold water. Stir at 1–2° for 60 minutes, keeping the pH at 6.0 by the addition of 1 N NaOH. Filter, and freeze-dry the filtrate. The product is active against both Gram-positive and Gram-negative organisms.

*Example IV*

When in the procedure of Example II, the N-carboxyanhydride of 5-nitroanthranilic acid is replaced by 0.8 millimole of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

*Example V*

When in the procedure of Example I, the 6-(DL-N-methyl-2-aminophenylacetamido)penicillanic acid is replaced by 0.8 millimole of 6-(2-anilinoacetamido)penicillanic acid and the isatoic anhydride by glycine-N-carboxy anhydride, there is produced 6-[2-(D-2-amino-N-phenylacetamido)acetamido]penicillanic acid, which is active against both Gram-positive and Gram-negative microorganisms.

*Example VI*

When in the procedure of Example V, the 6-(2-anilinoacetamido)penicillanic acid is replaced by 0.8 millimole of 6-(DL-N-ethyl-2-aminophenylacetamido)penicillanic acid, the corresponding penicillin product, active against both Gram-positive and Gram-negative microorganisms, is produced.

*Example VII*

When in the procedure of Example V, the 6-(2-anilinoacetamido)penicillanic acid is replaced by 0.8 millimole of 6-(DL-N-amyl-2-aminophenylacetamido)penicillanic acid, the corresponding penicillin product, active against both Gram-positive and Gram-negative microorganisms, is produced.

*Example VIII.—6-[L-2-(D-2-amino-2-phenylacetamido)-4-methylvaleramido]penicillanic acid*

Mix 395 mg. (1.2 millimoles) of 6-(L-2-amino-4-methylvaleramido)penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example IX.—6-[2-(D-2-amino-4-methylvaleramido)acetamido]penicillanic acid*

Mix 218 mg. (0.8 millimole) of 6-(2-aminoacetamido)-penicillanic acid with 126 mg. (0.8 millimole) of the N-carboxyanhydride of D-leucine in 20 ml. of ice-cold water. Stir at 1–2° for 60 minutes, keeping the pH at 6.0 by the addition of 1 N NaOH. Filter, and freeze-dry the filtrate. The product is active against both *Staph. aureus* and *E. coli*.

*Example X*

When in the procedure of Example IX, the N-carboxyanhydride of D-leucine is replaced by 0.8 millimole of the N-carboxyanhydride of (1) Glycine
(2) D-phenylglycine
(3) D-phenylalanine
(4) L-phenylalanine
(5) 1-aminocyclobutanecarboxylic acid
(6) 1-aminocyclopentanecarboxylic acid
(7) 1-aminocyclohexanecarboxylic acid
(8) 1-aminocyclooctanecarboxylic acid
(9) Anthranilic acid
(10) 2-amino-5-nitrobenzoic acid
(11) 2-amino-5-chlorobenzoic acid
(12) D-tryptophan
(13) L-tryptophan
(14) L-cystine
(15) DL-phenylsarcosine
(16) N-phenylglycine
(17) DL-o-ethoxyphenylglycine respectively, the following corresponding penicillin derivatives, all active against Gram-positive and Gram-negative microorganisms, are produced:

(1) 6-[2-(2-aminoacetamido)acetamido]penicillanic acid
(2) 6 - [2 - (D-2-amino-2-phenylacetamido)acetamido]penicillanic acid
(3) 6 - [2-(D-2-amino-3-phenylpropionamido)acetamido]penicillanic acid
(4) 6 - [2-(L-2-amino-3-phenylpropionamido)acetamido]penicillanic acid
(5) 6 - [2-(1-aminocyclobutanecarboxamido)acetamido]penicillanic acid
(6) 6 - [2-(1-aminocyclopentanecarboxamido)acetamido]penicillanic acid
(7) 6 - [2-(1-aminocyclohexanecarboxamido)acetamido]penicillanic acid
(8) 6 - [2-(1-aminocyclooctanecarboxamido)acetamido]penicillanic acid
(9) 6-[2-(2-aminobenzamido)acetamido]penicillanic acid
(10) 6-[2-(2-amino-5-nitrobenzamido)acetamido]penicillanic acid
(11) 6 - [2-(2-amino-5-chlorobenzamido)acetamido]penicillanic acid
(12) 6-[2-(D-α-aminoindole-3-propionamido)acetamido]penicillanic acid
(13) 6-[2-(L-α-aminoindole-3-propionamido)acetamido]penicillanic acid
(14) Bis[6 - (2 - [L-3-thio-2-aminopropionamido]acetamido)penicillanic acid]

(15) 6 - [2-(DL-2-amino-N-methyl-2-phenylacetamido)acetamido]penicillanic acid
(16) 6-[2 - (2 - anilinoacetamido)acetamido]penicillanic acid
(17) 6 - [2 - (DL-2-amino-2-o-ethoxyphenylacetamido)acetamido]penicillanic acid

*Example XI.—6-[D-2-(2-aminoacetamido)-4-methylvaleramido]penicillanic acid*

Mix 263 mg. (0.8 millimole) of 6-(D-2-amino-4-methylvaleramido)penicillanic acid with 80 mg. (0.8 millimole) of the N-carboxyanhydride of glycine in 20 ml. of ice-cold water. Stir at 1–2° for 60 minutes, keeping the pH at 6.0 by the addition of 1 N NaOH. Filter, and freeze-dry the filtrate. The product is active against both *Staph. aureus* and *E. coli*.

*Example XII*

When in the procedure of Example XI, the N-carboxyanhydride of glycine is replaced by 0.8 millimole of the N-carboxyanhydride of (1) D-leucine
(2) D-penylglycine
(3) D-phenylalanine
(4) L-phenylalanine
(5) 1-aminocyclobutanecarboxylic acid
(6) 1-aminocyclopentanecarboxylic acid
(7) anthranilic acid
(8) 2-amino-5-nitrobenzoic acid
(9) D-trytophan
(10) L-trytophan
(11) D-methionine
(12) L-cystine
(13) DL-phenylsarcosine
(14) N-phenylglycine respectively, the following corresponding penicillin derivatives, all active against Gram-positive and Gram-negative microorganisms, are produced:

(1) 6 - [D-2-(D-2-amino-4-methylvaleramido)-4-methylvaleramido]penicillanic acid
(2) 6 - [D-2-(D-2-amino-2-phenylacetamido)-4-methylvaleramido]penicillanic acid
(3) 6 - [D-2-(D-2-amino-3-phenylpropionamido)-4-methylvaleramido]penicillanic acid
(4) 6 - [D-2-(L-2-amino-3-phenylpropionamido)-4-methylvaleramido]penicillanic acid
(5) 6 - [D-2-(1-aminocyclobutanecarboxamido)-4-methylvaleramido]penicillanic acid
(6) 6 - [D-2-(1-aminocyclohexanecarboxamido)-4-methylvaleramido]penicillanic acid
(7) 6 - [D-2-(2-aminobenzamido)-4-methylvaleramido]penicillanic acid
(8) 6 - [D-2-(2-amino-5-nitrobenzamido)-4-methylvaleramido]penicillanic acid
(9) 6 - [D-2-(D-α-aminoindole-3-propionamido)-4-methylvaleramido]penicillanic acid
(10) 6 - [D-2-(L-α-aminoindole-3-propionamido)-4-methylvaleramido]penicillanic acid
(11) 6 - [D-2-[D-2-amino-4-(methylthio)butyramido]-4-methylvaleramido]penicillanic acid
(12) Bis[6 - (D - 2-[L-3-thio-2-aminopropionamido]-4-methylvaleramido)]penicillanic acid
(13) 6 - [D - 2-(DL-2-amino-N-methyl-2-phenylacetamido)-4-methylvaleramido]penicillanic acid
(14) 6 - [D-2-(2-anilinoacetamido)-4-methylvaleramido]penicillanic acid

*Example XIII.—6-[L-2-(D-2-amino-2-phenylacetamido)phenylpropionamido]penicillanic acid*

Mix 436 mg. (1.2 millimoles) of 6-(L-2-aminophenylpropionamido)penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example XIV.—6-[D-2-(2-aminoacetamido)-2-phenylacetamido]penicillanic acid*

Mix 420 mg. (1.2 millimoles) of 6-(D-2-amino - 2-phenylacetamido)penicillanic acid with 121 mg. (1.2 millimoles) of glycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against both *Staph. aureus* and *E. coli*.

*Example XV*

When in the procedure of Example XIV, the N-carboxyanhydride of glycine is replaced by 1.2 millimoles of the N-carboxyanhydride of (1) D-leucine
(2) L-leucine
(3) D-phenylglycine
(4) D-phenylalanine
(5) L-phenylalanine
(6) 1-aminocyclobutanecarboxylic acid
(7) 1-aminocyclopentanecarboxylic acid
(8) 1-aminocyclohexanecarboxylic acid
(9) 1-aminocyclooctanecarboxylic acid
(10) 2-amino-5-nitrobenzoic acid
(11) 2-amino-5-chlorobenzoic acid
(12) 2-amino-5-methylbenzoic acid
(13) D-tryptophan
(14) L-tryptophan
(15) D-methionine
(16) DL-phenylsarcosine
(17) N-phenylglycine
(18) DL-glutamine
(19) DL-o-ethoxyphenylglycine
(20) cystine
(21) anthranilic acid respectively, the following corresponding penicillin derivatives, all active against Gram-positive and Gram-negative microorganisms, are produced:

(1) 6-[D-2-(D-2-amino-4-methylvaleramido)-2-phenylacetamido]penicillanic acid
(2) 6-[D-2-(L-2-amino-4-methylvaleramido)-2-phenylacetamido]penicillanic acid
(3) 6-[D-2-(D-2-amino-2-phenylacetamido)-2-phenylacetamido]penicillanic acid
(4) 6-[D-2-(D-2-amino-3-phenylpropionamido)-2-phenylacetamido]penicillanic acid
(5) 6-[D-2-(L-2-amino-3-phenylpropionamido)-2-phenylacetamido]penicillanic acid
(6) 6-[D-2-(1-amino-cyclobutanecarboxamido)-2-phenylacetamido]penicillanic acid
(7) 6-[D-2-(1-amino-cyclopentanecarboxamido)-2-phenylacetamido]penicillanic acid
(8) 6-[D-2-(1-amino-cyclohexanecarboxamido)-2-phenylacetamido]penicillanic acid
(9) 6-[D-2-(1-amino-cyclooctanecarboxamido)-2-phenylacetamido]penicillanic acid
(10) 6-[D-2-(2-amino-5-nitrobenzoic)-2-phenylacetamido]penicillanic acid
(11) 6-[D-2-(2-amino-5-chlorobenzamido)-2-phenylacetamido]penicillanic acid
(12) 6-[D-2-(2-amino-5-methylbenzamido)-2-phenylacetamido]penicillanic acid
(13) 6-[D-2-(D-α-aminoindole-3-propionamido)-2-phenylacetamido]penicillanic acid
(14) 6-[D-2-(L-α-aminoindole-3-propionamido)-2-phenylacetamido]penicillanic acid
(15) 6-[D-2-(D-2-amino-4-methylthiobutyramido)-2-phenylacetamido]penicillanic acid
(16) 6-[D-2-(DL-2-amino-N-methyl-2-phenylacetamido)-2-phenylacetamido]penicillanic acid

(17) 6-[D-2-(2-anilinoacetamido)-2-phenylacetamido]penicillanic acid
(18) 6-[D-2-(DL-2-aminoglutaramido)-2-phenylacetamido]penicillanic acid
(19) 6-[D-2-(DL-2-amino-2-o-ethoxyphenylacetamido)-2-phenylacetamido]penicillanic acid
(20) bis[6-(D-2-[L-3-thio-2-aminopropionamido]-2-phenylacetamido]penicillanic acid
(21) 6-[D-2-(2-aminobenzamido)-2-phenylacetamido]penicillanic acid

*Example XVI*

When in the procedure of Example III, the 6-methylisatoic anhydride is replaced by 6-sulfoisatoic anhydride, the corresponding derivative is obtained.

*Example XVII*

When in the procedure of Example IX, the N-carboxyanhydride of D-leucine is replaced by 0.8 millimole of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

*Example XVIII*

When in the procedure of Example XIV, the N-carboxyanhydride of glycine is replaced by 1.2 millimoles of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

*Example XIX.—6-[D-2-(D-2-amino-2-phenylacetyl)-amino-2-phenylacetamido]penicillanic acid*

Mix 50 mg. of ampicillin and 20 mg. of D-phenylglycine in 5 ml. of 0.1 M sodium acetate-acetic acid buffer at pH 4.7. Stir at 1° C. for 2 hours. Filtrate and concentrate, after which agar plate assays against *E. coli* and hydroxylamine determinations of total β-lactam demonstrate the formation of the new antibiotic having the following elemental analysis:

Found: C, 58.6; H, 5.60; N, 11.20; S, 6.2. Calculated for $C_{24}H_{26}O_5N_4S$: C, 59.8; H, 5.39; N, 11.61; S, 6.64.

As will be understood by those skilled in the art, the compounds of the invention may be utilized in their acid form or in the form of the therapeutically-active salts thereof, e.g., the sodium or potassium salts, or hydrochloride, etc., or in the form of the pharmaceutically-acceptable acid-addition salts prepared by the reaction of the penicillin compounds with an amine or diamine base, e.g., procaine, or various N,N'-disubstituted alkylenediamines, such as N,N'-dibenzylethylene-diamine, etc.

We claim:

1. A compound of the formula:

$$X^1-CH-CO-NH-CH-CH \underset{O=C-N}{\overset{S}{\diagup}} \underset{H}{\overset{CH_3}{\diagdown}} C-CH_3 \atop C-COOH$$
$$\underset{Y}{\overset{|}{N}}X^2$$

wherein:

$X^1$ is of the group consisting of hydrogen, lower alkyl, phenyl, and phenyl lower alkyl;
$X^2$ is of the group consisting of hydrogen, lower alkyl, and phenyl; and
Y is of the group consisting of:

(1) $$R^1-CH-CO- \atop \underset{R^2}{\overset{|}{NH}}$$

wherein:

$R^1$ is of the group consisting of hydrogen, lower alkyl, phenyl, (lower)alkylphenyl, (lower)alkoxyphenyl, aminophenyl, nitrophenyl, chlorophenyl, indolo(lower)alkyl, (lower)alkylindolo(lower)alkyl, and (lower)alkoxyindolo(lower)alkyl; and
$R^2$ is of the group consisting of hydrogen, lower alkyl, and phenyl;

(2) $$\underset{}{(CH_2)_n} \underset{NH_2}{\overset{|}{C}-CO-}$$

where $n=2$ to 9;

(3)

$$R^3-\underset{R^4}{\overset{R^2}{\diagup}}\underset{RNR^5}{\overset{R^1}{\diagdown}}-CO-$$

wherein:

$R^1$, $R^2$, $R^3$, and $R^4$ are of the group consisting of hydrogen, alkyl, sulfo, nitro and chloro;
$R^2$ and $R^3$ when joined complete a naphthylene ring; and
$R^5$ is of the group consisting of hydrogen and lower alkyl;

(4)

$$R^2-\underset{R^3}{\diagup}\underset{\overset{|}{N} \atop H}{\overset{R^1}{\diagdown}}-CH_2-CH-CO- \atop NH_2$$
$$R^4$$

where $R^1$, $R^2$, $R^3$, and $R^4$ are of the group consisting of hydrogen, lower alkyl, and lower alkoxy;

(5) $$R-S-(CH_2)_n-CH-CO- \atop NH_2$$

where:

$n=1$ to 5, and
R is of the group consisting of hydrogen and lower alkyl;

(6) $$\underset{}{(CH_2)_n} \underset{NH}{\overset{R}{\overset{|}{HC}-CO-}}$$

where:

R is of the group consisting of hydroxy and alkyl, and $n=2$ to 7; and (7) 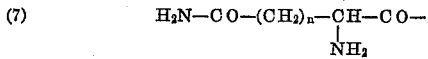

wherein $n=1$ to 2.

2. 6-[DL-2-(2 - amino-5-methyl-N-methylbenzamido)-2-phenylacetamido]penicillanic acid.

3. 6-[L-2-(D - 2-amino-2-phenylacetamido)-4-methyl-valeramido]penicillanic acid.

4. 6 - [D - 2 - (D - 2 - amino - 2 - phenylacetamido) 2-phenylacetamido]penicillanic acid.

5. 6 - [D - 2 - (D - 2 - amino - 3 - phenylpropionamido) 2-phenylacetamido]penicillanic acid.

6. 6 - [D - 2 - (1 - amino-cyclobutanecarboxamido) 2-phenylacetamido]penicillanic acid.

7. 6 - [D - 2 - (1 - amino-cyclopentanecarboxamido) 2-phenylacetamido]penicillanic acid.

8. 6 - [D - 2 - (1 - amino-cyclohexanecarboxamido) 2-phenylacetamido]penicillanic acid.

9. 6 - [L - 2 - (D - 2 - amino-2-phenylacetamido) phenylpropionamido]penicillanic acid.

10. 6 - [2 - (D - 2 - amino - 2 - phenylacetamido) acetamido]penicillanic acid.

11. 6 - [2 - (1 - aminocyclobutanecarboxamido)acetamido]penicillanic acid.

12. 6 - [2 - ( 1 - aminocyclopentanecarboxamido) acetamido]penicillanic acid.

13. 6 - [2 - (1 - aminocyclohexanecarboxamido)acetamido]penicillanic acid.

14. 6 - [D - 2 - (D - 2 - amino-2-phenylacetamido)-4-methyl-valeramido]penicillanic acid.

15. 6 - [D - 2 - (1 - aminocyclobutanecarboxamido) 4-methylvaleramido]penicillanic acid.

16. 6 - [D - 2 - (1 - aminocyclopentanecarboxamido) 4-methylvaleramido]penicillanic acid.

17. 6 - [L - 2 - (D - 2 - amino-2-phenylacetamido) 2-phenylacetamido]penicillanic acid.

18. 6 - [L - 2 - (D - 2 - aminoindole-3-propionamido) 2-phenylacetamido]penicillanic acid.

19. 6 - [L - 2 - (D-2-amino-4-methylthiobutyramido) 2-phenylacetamido]penicillanic acid.

20. 6 - [L - 2 - (D - 2-amino-2-phenylacetamido)-3-phenylpropionamido]penicillanic acid.

No references cited.

NICHOLAS S. RIZZO, *Primary Examiner.*